United States Patent
Morita

(10) Patent No.: US 11,264,838 B2
(45) Date of Patent: Mar. 1, 2022

(54) SEMICONDUCTOR DEVICE AND SEMICONDUCTOR MODULE

(71) Applicant: LAPIS SEMICONDUCTOR CO., LTD, Kanagawa (JP)

(72) Inventor: Koji Morita, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 176 days.

(21) Appl. No.: 16/233,660

(22) Filed: Dec. 27, 2018

(65) Prior Publication Data

US 2019/0207426 A1 Jul. 4, 2019

(30) Foreign Application Priority Data

Jan. 4, 2018 (JP) .............................. JP2018-000133

(51) Int. Cl.
*H02J 50/12* (2016.01)
*H02J 50/80* (2016.01)
*H02J 7/02* (2016.01)
*H04W 4/80* (2018.01)

(52) U.S. Cl.
CPC .............. *H02J 50/12* (2016.02); *H02J 7/025* (2013.01); *H02J 50/80* (2016.02); *H04W 4/80* (2018.02)

(58) Field of Classification Search
CPC ............ H02J 50/12; H02J 50/80; H02J 7/025; H04W 4/80
USPC ........................................................ 320/108
See application file for complete search history.

(56) References Cited

U.S. PATENT DOCUMENTS

| | | |
|---|---|---|
| 9,269,992 B2 * | 2/2016 | Okamura .............. H02J 7/0016 |
| 10,063,105 B2 * | 8/2018 | Leabman ................ H02J 50/15 |
| 10,651,692 B2 * | 5/2020 | Uehara .................... H02J 50/10 |
| 2006/0082485 A1 | 4/2006 | Kobayashi et al. |
| 2009/0028224 A1 | 1/2009 | Miyagi et al. |
| 2015/0254481 A1 | 9/2015 | Masuda et al. |
| 2017/0141621 A1 * | 5/2017 | Zeine ...................... H02J 50/40 |
| 2018/0255001 A1 * | 9/2018 | Chritz ...................... H04B 7/04 |

FOREIGN PATENT DOCUMENTS

| | | |
|---|---|---|
| JP | H11274970 A | 10/1999 |
| JP | 2004350322 A | 12/2004 |
| JP | 2006112923 A | 4/2006 |
| JP | 2008-113519 A | 5/2008 |
| JP | 2012004302 A | 1/2012 |
| JP | 2014-079091 A | 5/2014 |
| JP | 2016-111792 A | 6/2016 |
| WO | 2006095581 A1 | 9/2006 |
| WO | 2014091934 A1 | 6/2014 |

OTHER PUBLICATIONS

Document Submitted for Exceptions to Lack of Novelty and its English translation dated Jan. 19, 2018, 4 pgs.
Japan Office Action dated Oct. 5, 2021, application No. 2018-000133, 7 pgs.

\* cited by examiner

*Primary Examiner* — Richard V Muralidar
(74) *Attorney, Agent, or Firm* — Volentine, Whitt & Francos, PLLC

(57) ABSTRACT

A semiconductor device formed in a single semiconductor integrated circuit, the semiconductor device including: a transmission signal circuit block; a reception signal circuit block; a signal processing circuit block; and at least one of a charging control circuit block or a monitoring circuit block.

11 Claims, 8 Drawing Sheets

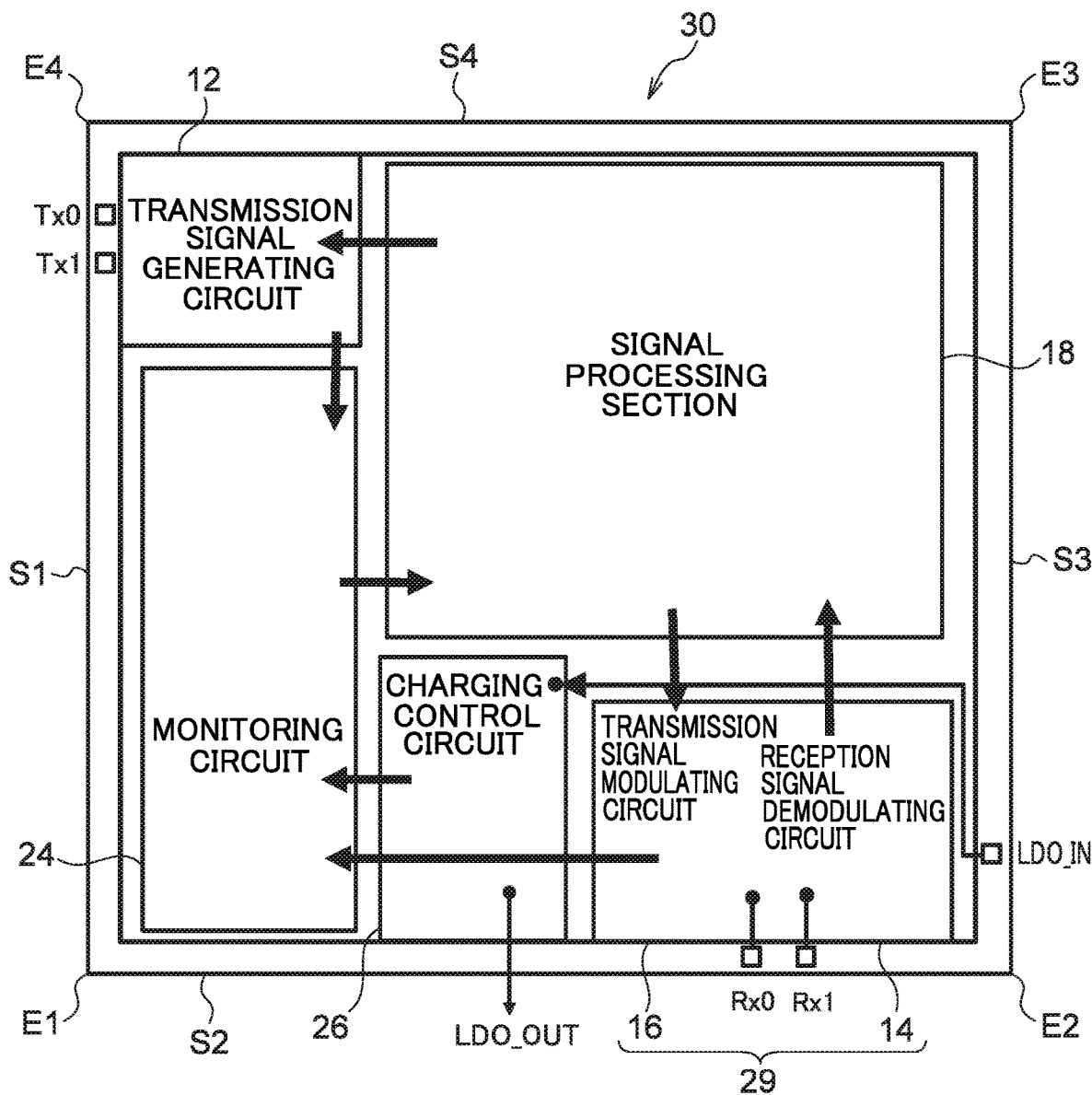

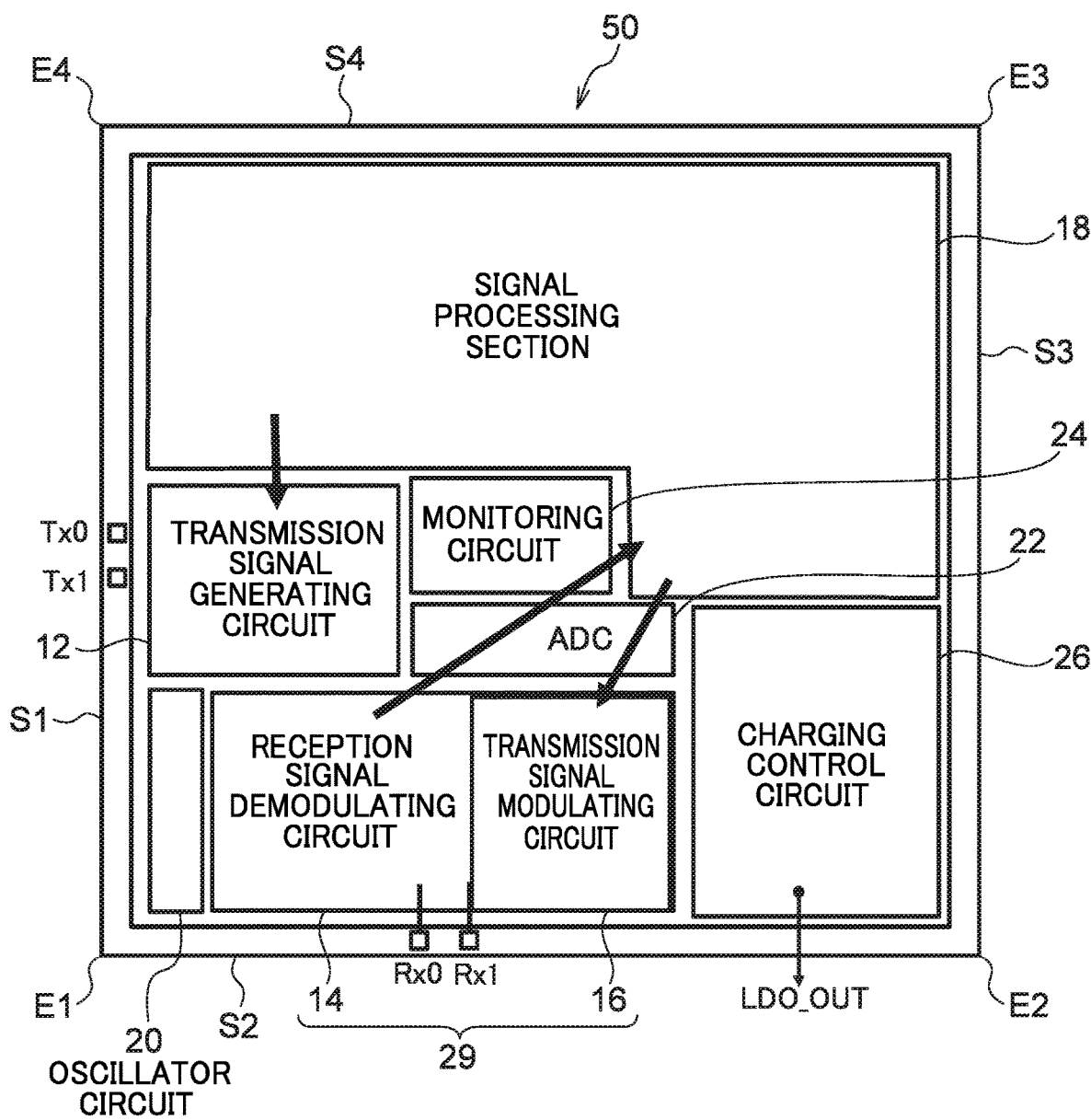

SEMICONDUCTOR DEVICE AND SEMICONDUCTOR MODULE

CROSS-REFERENCE TO RELATED APPLICATION

This application claims priority under 35 USC 119 from Japanese Patent Application No. 2018-000133, filed on Jan. 4, 2018, the disclosure of which is incorporated by reference herein.

BACKGROUND

Technical Field

The present disclosure relates to a semiconductor device and a semiconductor module for short-range wireless communications applications.

Related Art

In recent years, short-range wireless communication systems, particularly the contactless short-range wireless communication systems known as near field communication (NFC) systems, have become established. In an NFC system, along with wireless communications, electric power is supplied from a transmitting side to a receiving side via an antenna. Charging a battery incorporated at the receiving side or a device connected at the receiving side with electric power received at the receiving side has been investigated.

As an example of a conventional communication systems that implement both short-range wireless communications and wireless power transmission, Japanese Patent Application Laid-Open (JP-A) No. 2014-079091 discloses a communication system. In the communication system disclosed in JP-A No. 2014-079091, in a case in which transmitting and receiving signals between a transmitting device and a receiving device, the communication system switches between short-range wireless communications and wireless power transmission in time divisions. The transmitting device provides a common carrier wave for short-range wireless communications and wireless power transmission, transmits signals to the receiving device by short-range wireless communications, and supplies power to the receiving device by wireless power transmission. The receiving device receives signals from the transmitting device by the short-range wireless communications, and receives power from the transmitting device by the wireless power transmission. In a time division in which wireless power transmission is being implemented, received signals are attenuated and the attenuated signals are assigned to the short-range wireless communications. According to the communication system of JP-A No. 2014-079091, the same antenna is used for short-range wireless communications and wireless power transmission; the antenna is switched in the time divisions to implement the short-range wireless communications and the wireless power transmission. Thus, communication efficiency and charging efficiency may be improved.

As another reference relating to NFC communication systems, JP-A No. 2016-111792 discloses a power-receiving device. The power-receiving device disclosed in JP-A No. 2016-111792 includes: an antenna that receives input signals provided by wireless from a power supply device; a power reception unit that inputs input signals received by the antenna and obtains power for operating the power-receiving device from the input signals; an attenuator that attenuates the power of input signals received by the antenna; and a communications unit that inputs the input signals attenuated by the attenuator and obtains information from the input signals. According to the power-receiving device of JP-A No. 2016-111792, in a case in which the antenna for obtaining power and the antenna for obtaining information by communications are the same antenna, inputs of excessive power to the communications unit may be reduced.

As an example of another reference relating to a structure that charges a battery by receiving electric power, a communication system disclosed in JP-A No. 2008-113519 is known. The communication system disclosed in JP-A No. 2008-113519 includes a reader-writer and a portable terminal that conduct near field communications via magnetic fields. The reader-writer sends a charging command that commands charging to the portable terminal. In response to the received charging command, the portable terminal sends a response to the reader-writer that includes charging duration information representing a charging duration required for charging of a built-in battery. For the charging duration included in the received response, the reader-writer lowers the resistance value of an output resistance, and thus, the generated strength of the magnetic fields are increased. The portable terminal lowers an input resistance of an antenna for the charging duration, and supplies electric power obtained from the magnetic fields to the battery. According to the communication system of JP-A No. 2008-113519, efficient contactless charging may be realized using communication antennas.

The topic of using short-range wireless communication systems that feature power transmission is wide-ranging, from large devices such as reader-writers in train station ticket gates to small devices such as wearable devices (for example, watches, earphones, hearing aids, spectacles and the like) and so forth. In current trends, reducing the sizes and prices of short-range wireless communication systems is a pressing matter, particularly for small devices. It is not uncommon for semiconductor devices (semiconductor integrated circuits) to be used in short-range wireless communication systems.

As integration advances, many of the functions required by transmitting devices and receiving devices may be provided in both. In a case in which both a transmission circuit and a receiving circuit are embedded, necessary functions are made available; operation as a system enables miniaturization of the whole system and the elimination of fabrication costs, including testing procedures for quality assurance.

In this respect, in the communication system of JP-A No. 2008-113519, a transmission control unit that is part of the transmitting side and a reception control unit that is part of the receiving side, may be provided in an integrated circuit. However, there is still scope for improvement in regard to integration that includes other control units, for charging control and such. A transmitter and a receiver are disclosed as being respectively separate objects in JP-A Nos. 2014-079091 and 2016-111792. These references disclose how to implement a short-range wireless communication system in a semiconductor integrated circuit.

SUMMARY

The present disclosure provides a semiconductor device and semiconductor module that may realize a reduction in size and a lowering in price of a short-range wireless communication system.

A first aspect of the present disclosure is a semiconductor device formed in a single semiconductor integrated circuit, the semiconductor device including: a transmission signal circuit block; a reception signal circuit block; a signal processing circuit block; and at least one of a charging control circuit block or a monitoring circuit block.

A second aspect of the present disclosure is a semiconductor module including: a semiconductor device according to the first aspect; and a first antenna and a first resonance circuit that are connected to an output terminal of the transmission signal circuit block.

A third aspect of the present disclosure is a semiconductor module including: a semiconductor device according to the first aspect; and a second antenna, a second resonance circuit and a rectifying circuit that are connected to an input terminal of the reception signal circuit block.

According to the aspects described above, a semiconductor device and semiconductor module of the present disclosure may realize a reduction in size and a lowering in price of a short-range wireless communication system.

BRIEF DESCRIPTION OF THE DRAWINGS

Exemplary embodiments will be described in detail based on the following figures, wherein:

FIG. 4 is a plan diagram showing a circuit layout according to the first exemplary embodiment;

FIG. 5 is a plan diagram showing a circuit layout according to a second exemplary embodiment;

DETAILED DESCRIPTION

Herebelow, exemplary embodiments for carrying out the present disclosure are described in detail with reference to the attached drawings. Below, a case in which a semiconductor device used for short-range wireless communications (for example, an NFC system) that has a function for transmitting electric power contactlessly, is described as an example of the semiconductor device according to the present disclosure. The semiconductor device according to the present exemplary embodiments includes a charging control circuit for charging equipment connected at a receiving side. The semiconductor device according to the present exemplary embodiments is, as an example, described as a semiconductor device that incorporates transmission functions and reception functions. A system including a portable terminal featuring contactless IC card functions and a reader-writer that transmits and receives data to and from the portable terminal is described as an example of a wireless communication system.

First Exemplary Embodiment

Figure 1:
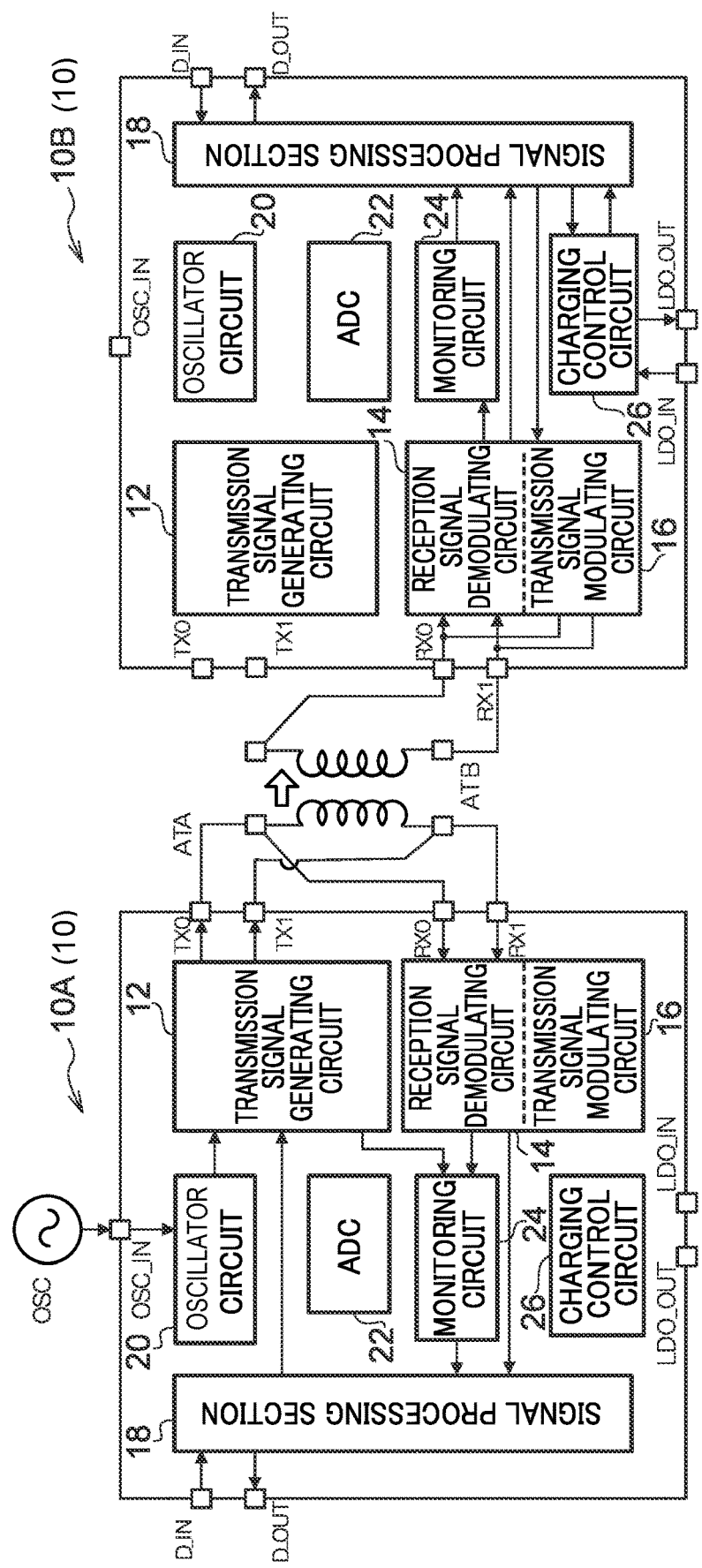
FIG. 1 is a block diagram showing circuit structures of a semiconductor device according to a first exemplary embodiment.

A semiconductor device 10 according to the first exemplary embodiment is described with reference to FIG. 1. The semiconductor device 10 combines circuit blocks associated with the transmission functions of the wireless system of the present exemplary embodiment and circuit blocks associated with the reception functions. In other words, the semiconductor device 10 may be used both as a receiving side semiconductor device and as a transmitting side semiconductor device, depending on its place in a system configuration. A semiconductor device 10A shown in FIG. 1 is configured so as to perform the transmitting side functions of the semiconductor device 10, and a semiconductor device 10B is configured so as to perform the receiving side functions of the semiconductor device 10. As shown in FIG. 1, the semiconductor device 10A and the semiconductor device 10B have similar circuit structures including external terminals (an antenna ATA and an antenna ATB). In the example in FIG. 1, the semiconductor device 10A is installed at the reader-writer side and the semiconductor device 10B is installed at the portable terminal side.

As shown in FIG. 1, each semiconductor device 10 includes a transmission signal generating circuit 12, a reception signal demodulating circuit 14, a transmission signal modulating circuit 16, a signal processing section 18, an oscillator circuit 20, an analog-to-digital converter (ADC) 22, a monitoring circuit 24, and a charging control circuit 26. The transmission signal generating circuit 12 and oscillator circuit 20 correspond to a transmission signal circuit block of the present disclosure, the reception signal demodulating circuit 14 and transmission signal modulating circuit 16 correspond to a reception signal circuit block of the present disclosure, the signal processing section 18 and ADC 22 correspond to a signal processing circuit block of the present disclosure, the charging control circuit 26 corresponds to a charging control circuit block of the present disclosure, and the monitoring circuit 24 corresponds to a monitoring circuit block of the present disclosure.

The antennas ATA and ATB are coils that form electromagnetic fields between the transmitting side and the receiving side for wireless communications and for transmitting power by a wireless power transmission system. The antenna ATA is connected to a terminal TX0 and a terminal TX1, which are output terminals of the transmission signal generating circuit 12 of the semiconductor device 10A, and to a terminal RX0 and a terminal RX1, which are input terminals of the reception signal demodulating circuit 14 of the semiconductor device 10A. The antenna ATB is connected to the terminals RX0 and RX1 of the semiconductor device 10B. Thus, the antennas are used as both antennas for wireless communications and antennas for wireless power transmission. The antenna ATA outputs communication signals for communicating or superimposed signals in which the communication signals and power transmission signals for transmitting power are superimposed. The antenna ATB receives the communication signals and power transmission signals transmitted from the transmitting side via electromagnetic fields.

Figure 2:
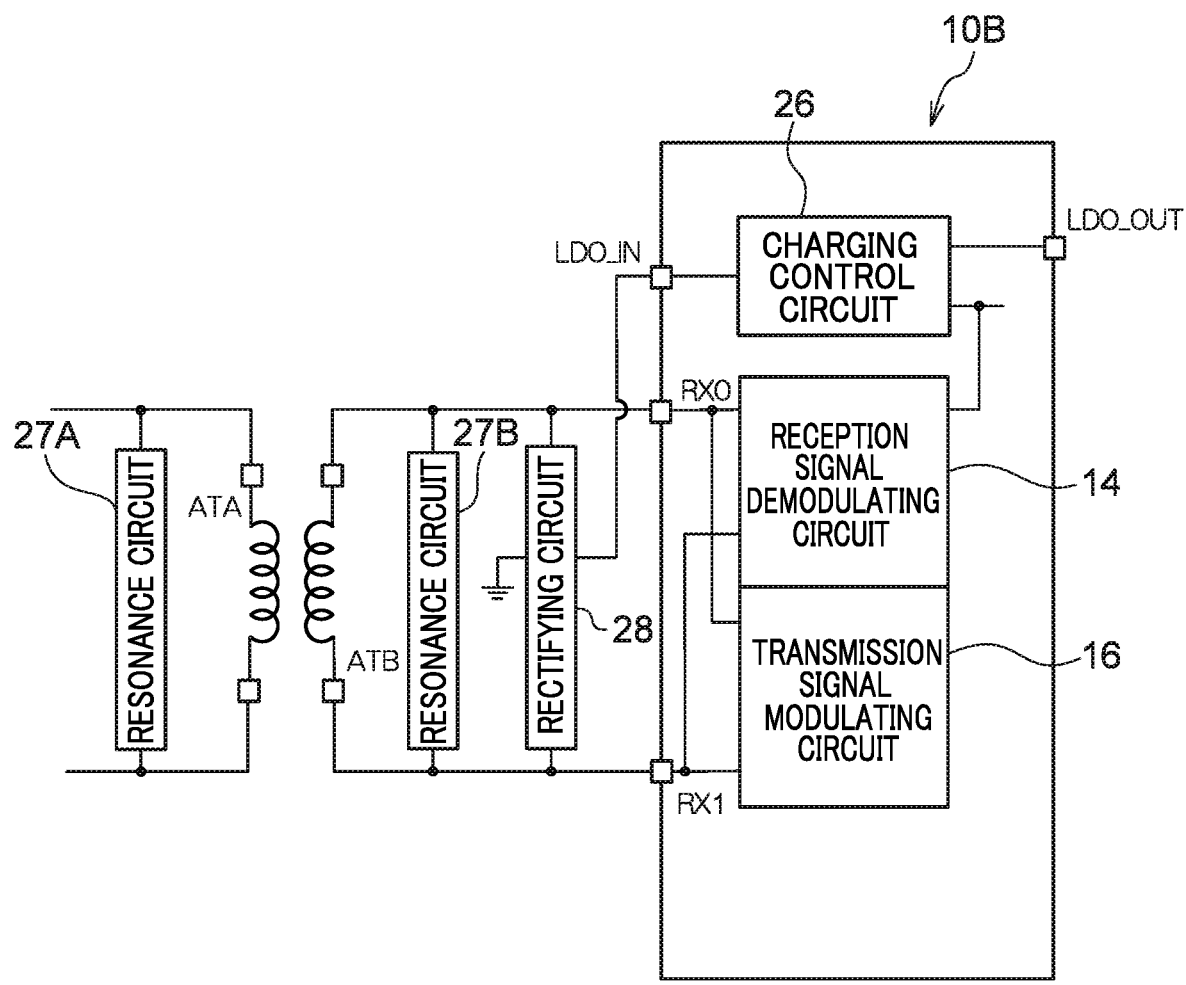
FIG. 2 is a block diagram showing connections of resonance circuits and a rectifying circuit of the semiconductor device according to the first exemplary embodiment.

In the present exemplary embodiment, the wireless power transmission system (contactless power transmission system) that is used is not particularly limited. However, as an example, a magnetic resonance system is employed. The magnetic resonance system employs a resonance circuit 27A connected to the antenna ATA and a resonance circuit 27B connected to the antenna ATB, which are shown in FIG. 2, producing a link to transmit power by resonance of magnetic fields (sympathetic oscillation) between the resonance circuit at the power-transmitting side and the resonance circuit at the power-receiving side The wireless power transmission system according to the present exemplary embodiment is not limited to the above. An electromagnetic induction system, an electric field resonance system or the like may be employed.

The oscillator circuit 20 generates a carrier wave for wireless communications and wireless power transmission between the semiconductor device 10A and the semiconductor device 10B, and supplies the carrier wave to the transmission signal generating circuit 12. The oscillator circuit 20 is connected to an external clock source OSC via a terminal OSC_IN and generates carrier wave signals synchronously with clock signals from the clock source OSC. The oscillator circuit 20 is used during both short-range wireless communications and wireless power transmission. Namely, a carrier wave frequency for short-range wireless communications and a carrier wave frequency for wireless power transmission are the same frequency. A value of the carrier wave frequency is not particularly limited but is, for example, 13.56 MHz in the present exemplary embodiment. Namely, in the present exemplary embodiment, wireless communications and wireless power transmission use carrier wave signals with the same frequency and phase. Therefore, the semiconductor device 10A and semiconductor device 10B may use the same antennas for wireless communications and for wireless power transmission.

The transmission signal generating circuit 12 of the semiconductor device 10A generates communication signals and power transmission signals. The transmission signal generating circuit 12 generates communication signals conforming to NFC standards on the basis of signals received from the signal processing section 18 and suchlike, and transmits the generated communication signals to the semiconductor device 10B via the antenna ATA. Namely, the transmission signal generating circuit 12 modulates data signals, combines the modulated signals with the carrier wave to form communication signals, and transmits the communication signals via the antenna ATA. In a case in which power is supplied from the semiconductor device 10A to the semiconductor device 10B, the communication signals are superimposed with power transmission signals and the superimposed signals are transmitted to the semiconductor device 10B (the antenna ATB) via the antenna ATA.

The reception signal demodulating circuit 14 of the semiconductor device 10B demodulates transmitted signals that have been sent from the semiconductor device 10A and received via the antenna ATB, extracts the data signals, and sends the data signals to the signal processing section 18. For two-way communications, communication signals sent from the semiconductor device 10B are demodulated at the reception signal demodulating circuit 14 of the semiconductor device 10A, and the demodulated data signals are sent to the signal processing section 18 of the semiconductor device 10A. Namely, each reception signal demodulating circuit 14 operates in both the semiconductor device 10A and the semiconductor device 10B.

The transmission signal modulating circuit 16 is a modulation circuit that is used for load modulation. Load modulation is a technique of controlling the impedance of the coil at the receiving side (the antenna ATB) to vary resonance conditions between the two coils (the antennas ATA and ATB) and send information, and detecting these variations at the transmitting side coil (the antenna ATA) to receive information. Accordingly, the transmission signal modulating circuit 16 usually operates only at the receiving side (the semiconductor device 10B).

The signal processing section 18 includes a microcontroller unit (MCU), memory and the like. The signal processing section 18 executes processing to generate data signals to be transmitted to the other side of the wireless communications, and executes various kinds of processing based on data signals received from the other side. As necessary, the signal processing section 18 may receive signals from outside the semiconductor device 10 via a terminal D_IN or send signals outside the semiconductor device 10 via a terminal D_OUT.

The monitoring circuit 24 monitors each circuit block in the semiconductor device 10 and sends monitoring statuses to the signal processing section 18 as appropriate. The monitoring circuit includes, for example, temperature monitoring. Various applications are possible such as, for example, current amounts corresponding to temperatures being converted from currents to voltages by a diode or the like and subjected to analog control by comparison with a reference voltage at a comparator, voltage values being digitized by an ADC and used in computing by a computer, temperature time series data being memorized, and the like.

The ADC 22 is an analog-to-digital conversion circuit, which principally converts analog signals generated in the semiconductor device 10 to digital signals. For example, in the temperature monitoring mentioned above, analog voltage values representing temperatures are converted to digital values. The converted digital signals representing temperatures may be outputted to outside the semiconductor device 10.

The charging control circuit 26 is what is known as a low-dropout regulator (LDO), which has a function for using an external voltage inputted through a terminal LDO_IN to produce a pre-specified voltage source. An LDO is a linear voltage regulator that operates even in a case in which the input voltage is large enough to exceed the desired output voltage to some extent. The constant voltage generated by the charging control circuit 26 is provided to the circuit blocks at the receiving side (the semiconductor device 10B). The charging control circuit 26 may also be used for charging of external equipment connected to the portable terminal in which the semiconductor device 10B is installed (contactless charging) and the like, via a terminal LDO_OUT.

Now, connections of the charging control circuit 26 are described more specifically with reference to FIG. 2. In the semiconductor device 10B according to the present exemplary embodiment, as mentioned above, power transmission signals sent from the semiconductor device 10A are received via the antenna ATB. Namely, at the semiconductor device 10B, resonance of electromagnetic fields produced by the power transmission signals or superimposed signals is inputted to the antenna ATB, and AC power is obtained by the resonance.

Accordingly, in the semiconductor device 10B as shown in FIG. 2, an external rectifying circuit 28 is provided being connected between the terminals RX0 and RX1. AC voltages received by the rectifying circuit 28 are converted to DC voltages, and are inputted to the charging control circuit 26 via the terminal LDO_IN. The charging control circuit 26 converts the inputted DC voltages to the constant voltage with the pre-specified voltage value, and provides the converted constant voltage to the respective parts of the semiconductor device 10B. The charging control circuit 26 may also output the generated constant voltage through the terminal LDO_OUT and store charge in a battery (not shown in the drawings) or, in some wireless communication systems, may supply power to equipment outside the semiconductor device 10B.

A semiconductor module according to the present exemplary embodiment is configured by, for example, the semiconductor device 10A being disposed inside a package and the external antenna ATA and resonance circuit 27A being connected to the terminals TX0 and TX1 of the semiconductor device 10A. As another example, a semiconductor module according to an alternative example of the present exemplary embodiment may be configured by the semiconductor device 10B being disposed inside a package, and the external antenna ATB, resonance circuit 27B and rectifying circuit 28 being connected to the terminals RX0 and RX1 of the semiconductor device 10B.

In the present exemplary embodiment, a case in which the resonance circuit 27A, the resonance circuit 27B and the rectifying circuit 28 are external circuits is described, but this is not limiting. However, these circuits may be incorporated in each of the semiconductor device 10A and the semiconductor device 10B. In a case in which the resonance circuit 27A and resonance circuit 27B are external circuits, adjustment becomes easier such that resonance characteristics of the resonance circuit 27A or resonance circuit 27B can be finely adjusted (a capacitance value of a capacitor structuring a resonance circuit is finely adjusted to achieve antenna matching or the like). Further, in such case, mounting becomes easier if the circuit size of the resonance circuit 27A or resonance circuit 27B is large. Furthermore, in such case, reducing interference in the semiconductor device 10B caused by resonating signals may be reduced. On the other hand, in a case in which the resonance circuit 27A and resonance circuit 27B are incorporated, the level of integration may be improved.

As mentioned above, the semiconductor device 10 according to the present exemplary embodiment combines transmitting side circuit blocks and receiving side circuit blocks. Therefore, the circuit blocks that are used in a case in which implementing transmitting side functions (in the semiconductor device 10A) differ from the circuit blocks that are used in a case in which implementing receiving side functions (in the semiconductor device 10B). Namely, the circuit blocks of the semiconductor device 10 may be categorized as circuit blocks that are used only at the transmitting side, circuit blocks that are used only at the receiving side, and circuit blocks that are used at both the transmitting side and the receiving side.

Figure 3A:
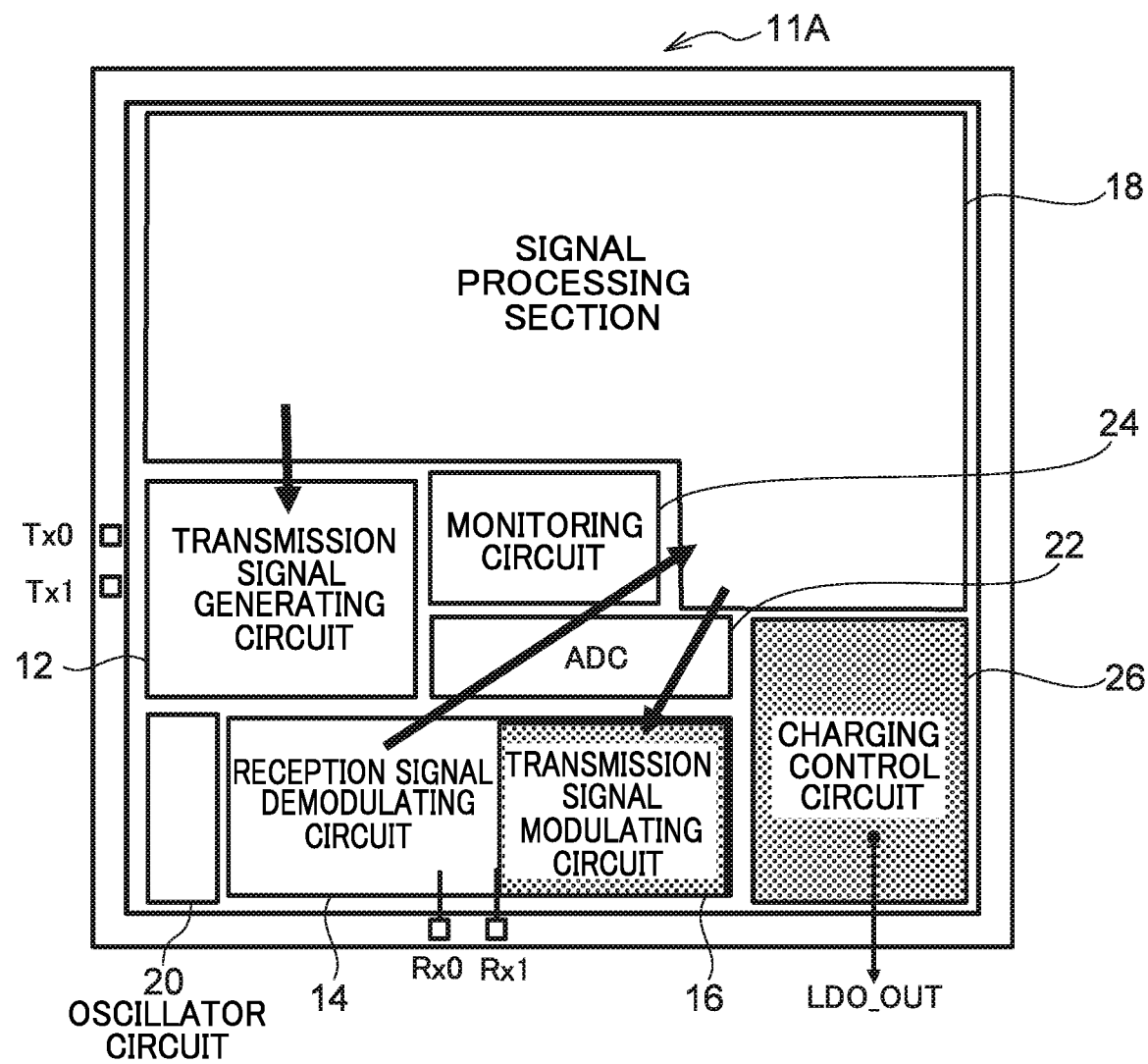
FIG. 3A is a semiconductor device layout diagram of the semiconductor device according to the first exemplary embodiment, showing circuit blocks that are unused during transmission.
Figure 3B:
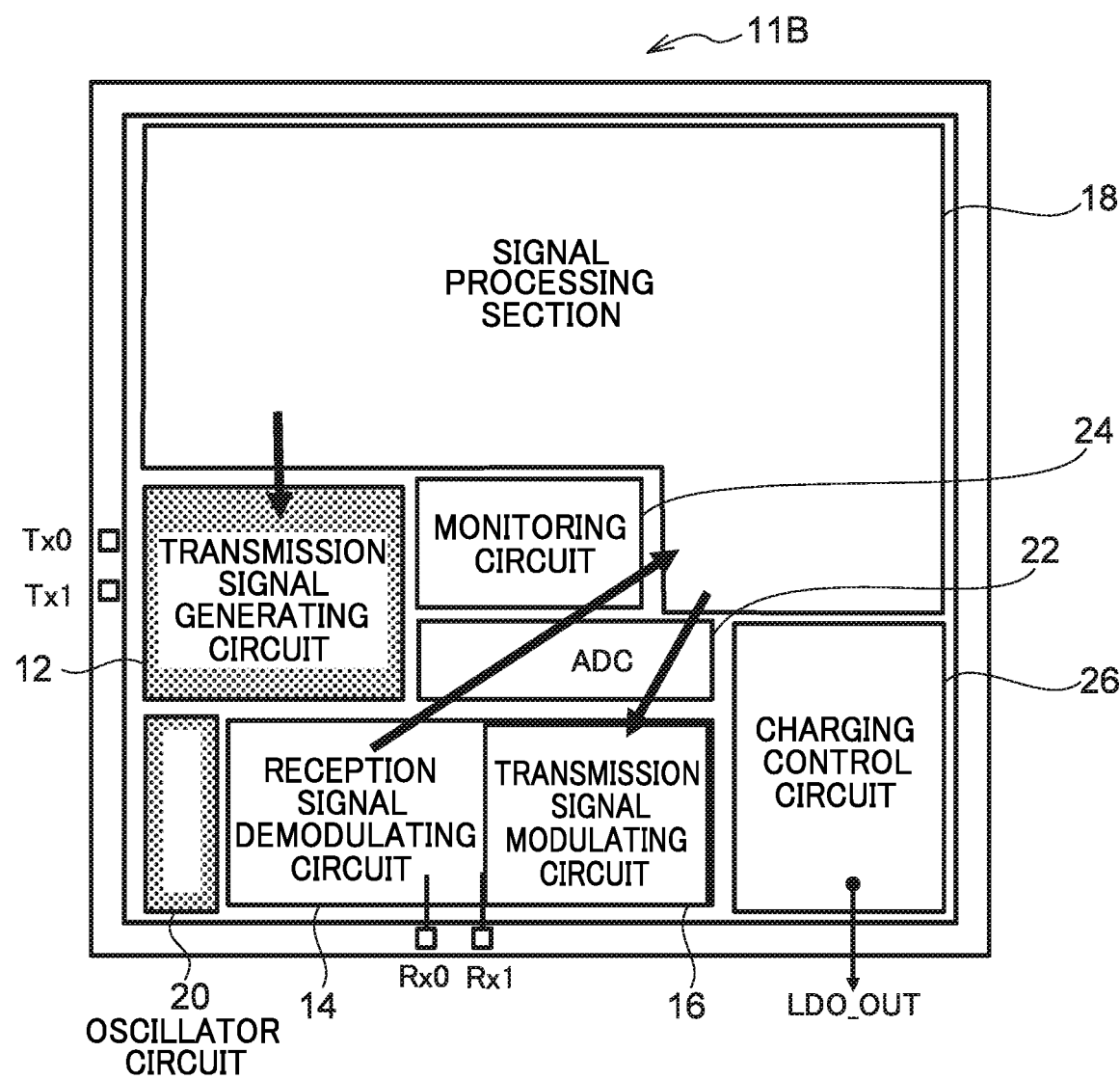
FIG. 3B is a semiconductor device layout diagram of the semiconductor device according to the first exemplary embodiment, showing circuit blocks that are unused during reception.

The above categories are described with reference to the layout diagrams shown in FIG. 3A and FIG. 3B. The arrows in FIG. 3A and FIG. 3B represent major wiring within the semiconductor device 10. A layout 11A shown in FIG. 3A depicts the circuit blocks that are used by the semiconductor device 10A implementing the transmitting side functions. Namely, the transmission signal generating circuit 12, oscillator circuit 20, reception signal demodulating circuit 14, signal processing section 18, monitoring circuit 24 and ADC 22 that are filled white in FIG. 3A are used in the semiconductor device 10A (also see FIG. 1). Meanwhile, the transmission signal modulating circuit 16 and charging control circuit 26 that are shaded in FIG. 3A are not used (also see FIG. 1).

On the other hand, a layout 11B shown in FIG. 3B depicts the circuit blocks that are used by the semiconductor device 10B implementing the receiving side functions. Namely, the reception signal demodulating circuit 14, transmission signal modulating circuit 16, signal processing section 18, charging control circuit 26, monitoring circuit 24 and ADC 22 that are filled white in FIG. 3B are used in the semiconductor device 10B (also see FIG. 1). Meanwhile, the transmission signal generating circuit 12 and oscillator circuit 20 that are shaded in FIG. 3B are not used (also see FIG. 1).

Thus, in the semiconductor device 10, the circuit blocks that are used only at the transmitting side are the transmission signal generating circuit 12 and the oscillator circuit 20. Further, the circuit blocks that are used only at the receiving side are the transmission signal modulating circuit 16 and the charging control circuit 26. Furthermore, the circuit blocks that are used at both the transmitting side and the receiving side are the reception signal demodulating circuit 14, the signal processing section 18, the monitoring circuit 24 and the ADC 22.

Now, integrated circuit layout in a case in which the level of integration of a semiconductor device is raised, are considered. In the semiconductor device 10 according to the present exemplary embodiment as described above, the charging control circuit 26 is incorporated, the level of integration is raised, and the transmitting side circuit blocks and receiving side circuit blocks are combined. In this semiconductor device 10, electromagnetic interference and thermal interference within the integrated circuit may occur. Namely, in a case in which the transmitting side that processes relatively large communication signals and power signals and the receiving side that processes relatively weak communication signals are formed on the same chip, the transmitting side signals act as noise and produce electromagnetic interference that affects receiving side circuit operations, heat generated at the transmitting side produces thermal interference that affects receiving side circuit operations, and suchlike. Thus, combining the transmitting side and the receiving side in the same semiconductor device is generally difficult. Furthermore, a bandgap reference circuit may be provided to generate threshold values for identifying weak signals at the receiving side. A bandgap reference circuit may suppress temperature and power source variations, however, may be vulnerable to the effects of external electromagnetic noise. Accordingly, in the semiconductor device 10 according to the present exemplary embodiment, the arrangement of the circuit blocks in the chip layout is determined so as to suppress electromagnetic interference and thermal interference as far as possible.

In contrast with the related art in which short-range wireless communications and wireless power transmissions are switched in time divisions, the following effects are provided. During short-range wireless communications, as described above, transmitting side circuit blocks (the transmission signal generating circuit 12 and the oscillator circuit 20) do not operate during receiving side operations, but a receiving side portion (the reception signal demodulating circuit 14) operates during transmitting side operations. On the other hand, during wireless power transmission, receiving side circuit blocks including the reception signal demodulating circuit 14 do not operate at the transmitting side. Therefore, if it is assumed that effects at the transmitting side during short-range wireless communications are at a level that may be ignored, it can be understood that electromagnetic effects and thermal effects need not be considered. Meanwhile, there is an effect that may suppress the effects of noise, particularly in a case in which switching between wireless power transmission using larger amplitude signals at the transmitting side and the receiving side, and short-range wireless communications using smaller amplitude signals.

The circuit layout according to the present exemplary embodiment is described with reference to FIG. 4. FIG. 4 is a diagram showing a circuit layout 30 of the semiconductor device 10 of the present exemplary embodiment. The arrangements of the oscillator circuit 20 and the ADC 22 are not major features of the present exemplary embodiment and are not shown in FIG. 4 but, for example, are disposed in portions of the area of the monitoring circuit 24 depicted in FIG. 4. In the semiconductor device 10 according to the present exemplary embodiment, the main circuit block that acts as a source for electromagnetic interference and thermal interference (below referred to as "the interfering circuit block") is the transmission signal generating circuit 12. The circuit blocks that are vulnerable to electromagnetic interference and thermal interference (below referred to as "the interfered circuit block") are the reception signal demodulating circuit 14 and the transmission signal modulating circuit 16 (below collectively referred to as the reception signal circuit 29).

The semiconductor device 10 according to the present exemplary embodiment is configured as a substantially rectangular semiconductor integrated circuit. For convenience in the following descriptions, as shown in FIG. 4, the semiconductor integrated circuit of the semiconductor device 10 features corner portions E1, E2, E3 and E4 and edges S1, S2, S3 and S4. In order to address the problems described above, in the present exemplary embodiment, the interfering circuit block (the transmission signal generating circuit 12) is arranged along the edge S1 of the semiconductor integrated circuit of the semiconductor device 10. Meanwhile, the interfered circuit block (the reception signal circuit 29) is arranged along the edge S2, which intersects with the edge S1 (meeting at the corner portion E1 of the semiconductor integrated circuit). Here, it is preferable if the positions of the interfering circuit block and the interfered circuit block are as far as possible from the corner portion E1.

The arrangement of the monitoring circuit 24 and signal processing section 18 in the circuit layout 30 according to the present exemplary embodiment is now described. As mentioned above, the monitoring circuit 24 and the signal processing section 18 operate at both the transmitting side (the semiconductor device 10A) and the receiving side (the semiconductor device 10B). Since internal logic signals thereof are comparatively stable, the monitoring circuit 24 and signal processing section 18 are thought to be less susceptible to the effects of electromagnetic interference and thermal interference than the reception signal circuit 29. Therefore, in the circuit layout 30 as shown in FIG. 4, the monitoring circuit 24 and the signal processing section 18 are disposed at positions dividing (spacing apart) the interfering logic block and the interfered logic block. Namely, in the semiconductor device 10 according to the present exemplary embodiment, a region in which the monitoring circuit 24 and the signal processing section 18 are disposed is used as a buffer region for electromagnetic interference and thermal interference.

Namely, the monitoring circuit 24 is disposed such that a position of one corner portion of the circuit block corresponds to a position of the corner portion E1, one edge of the circuit block lies along the edge S1, and another edge that intersects with the one edge lies along the edge S2. Meanwhile, the signal processing section 18 is disposed such that a position of one corner portion of the circuit block corresponds to a position of the corner portion E3 that opposes the corner portion E1, one edge of the circuit block lies along the edge S3 that opposes the edge S1, and another edge that intersects with the one edge lies along the edge S4 that opposes the edge S2.

As described above, the monitoring circuit 24 principally features functions for monitoring the circuit blocks in the semiconductor device 10. For example, the monitoring circuit 24 monitors temperatures of the transmission signal generating circuit 12 and reception signal circuit 29 in the semiconductor device 10. More specifically, a first temperature sensor (for example, the diode mentioned above), which is not shown in the drawings, is provided inside or close to the transmission signal generating circuit 12 and a second temperature sensor (not shown in the drawings) is provided inside or close to the reception signal circuit 29. Temperature distributions within the integrated circuit of the semiconductor device 10 differ between times of transmitting side operations and times of receiving side operations. As mentioned above, in a case in which the receiving side is operating, the transmitting side circuit blocks (the transmission signal generating circuit 12 and the oscillator circuit 20) do not operate, but in a case in which the transmitting side is operating, a receiving side portion (the reception signal demodulating circuit 14) does operate. Therefore, it is preferable to acquire detection signals from both of the two temperature sensors particularly during transmitting side operations.

In the present exemplary embodiment, the detection signals (analog signals) from the first temperature sensor and the second temperature sensor are sent to the monitoring circuit 24, and the respective detection signals are compared with pre-specified threshold values by, for example, a comparison circuit (comparator) in the monitoring circuit 24. In a case in which a threshold value is exceeded, the occurrence of a temperature anomaly at the transmission signal generating circuit 12 or the reception signal circuit 29 is reported and, as necessary, the semiconductor device 10 is reset. Therefore, the present exemplary embodiment in which the monitoring circuit 24 is disposed between the transmission signal generating circuit 12 and the reception signal circuit 29 is preferable with regard to flows of signals. In the present exemplary embodiment, a case in which the temperature detection signals are sent to the monitoring circuit 24 as unmodified analog signals, has been described. However, the present disclosure is not limited thereto. The detection signals may be converted to digital signals by the ADC 22 and then may be sent to the monitoring circuit 24, or the detection signals converted to digital signals may be sent to an external circuit.

The arrangement of the charging control circuit 26 according to the present exemplary embodiment is now described. The charging control circuit 26 is arranged along the edge S2 so as to lie along one edge of the reception signal circuit 29. As described above, since the charging control circuit 26 generates a constant voltage using DC signals that are inputted through the terminal LDO_IN via an external circuit (the rectifying circuit 28) connected to the terminals RX0 and RX1, and supplies the constant voltage to the receiving side circuit blocks, the charging control circuit 26 is disposed close to the receiving side circuit blocks.

As described above, according to the semiconductor device 10 of the present exemplary embodiment, the charging control circuit 26 and, as appropriate, the monitoring circuit 24 are integrated and the level of integration is raised. Thus, the semiconductor device 10 of the present exemplary embodiment may realize a reduction in size and a lowering of price of a short-range wireless communication system. In this circuit layout of the present exemplary embodiment, the effects of electromagnetic interference and thermal interference from the interfering circuit block on the interfered circuit block may be suppressed. Namely, in the semiconductor device 10 according to the present exemplary embodiment, since the transmission signal generating circuit 12 that is the interfering circuit block and the reception signal demodulating circuit 14 and transmission signal modulating circuit 16 that are the interfered circuit block are disposed as in the circuit layout 30 shown in FIG. 4, distance between the interfering circuit block and the interfered circuit block is increased. Thus, in a semiconductor device in which the transmitting side and the receiving side are combined, electromagnetic interference and thermal interference within the semiconductor device may be suppressed.

Second Exemplary Embodiment

A circuit layout 50 of the semiconductor device 10 according to a second exemplary embodiment is described with reference to FIG. 5. The respective circuit blocks shown in FIG. 5 are similar to FIG. 3A and FIG. 3B. Accordingly, the same circuit blocks are assigned the same reference symbols and are not described in detail.

As shown in FIG. 5, in the circuit layout 50, the transmission signal generating circuit 12 is arranged along the edge Si and the reception signal circuit 29 is arranged along the edge S2, which is similar to the circuit layout 30 shown in FIG. 4. In the circuit layout 50, however, the transmission signal generating circuit 12 and the reception signal circuit 29 are both disposed at positions close to the corner portion E1. Namely, the transmission signal generating circuit 12 is disposed along the edge S1 between the corner portions E1 and E4, and the reception signal circuit 29 is disposed along the edge S2 between the corner portions E1 and E2.

Meanwhile, the signal processing section 18 is disposed along the edge S4 from the corner portion E3 to the corner portion E4. For the reasons described above, the monitoring circuit 24 and the ADC 22 are disposed so as to divide (separate) the transmission signal generating circuit 12 that is the interfering circuit block from the reception signal circuit 29 that is the interfered circuit block. Also for the reasons described above, a position of one corner portion of the charging control circuit 26 corresponds with the corner portion E2, one edge of the charging control circuit 26 is disposed along the edge S2 and another edge of the charging control circuit 26 that intersects with the one edge is disposed along the edge S3.

Note that, the position of one corner portion of the transmission signal generating circuit 12, which is the interfering circuit block, does not need to be at a position corresponding with the corner portion E4, as long as it is disposed along the edge S1. Furthermore, the position of one corner portion of the reception signal circuit 29, which is the interfered circuit block, does not need to be at a position corresponding with the position of the corner portion E2, as long as it is disposed along the edge S2. In other words, the transmission signal generating circuit 12 and reception signal circuit 29 may be disposed closer together, with due consideration of levels of electromagnetic interference and thermal interference.

First Modified Example of the Second Exemplary Embodiment

Figure 6A:
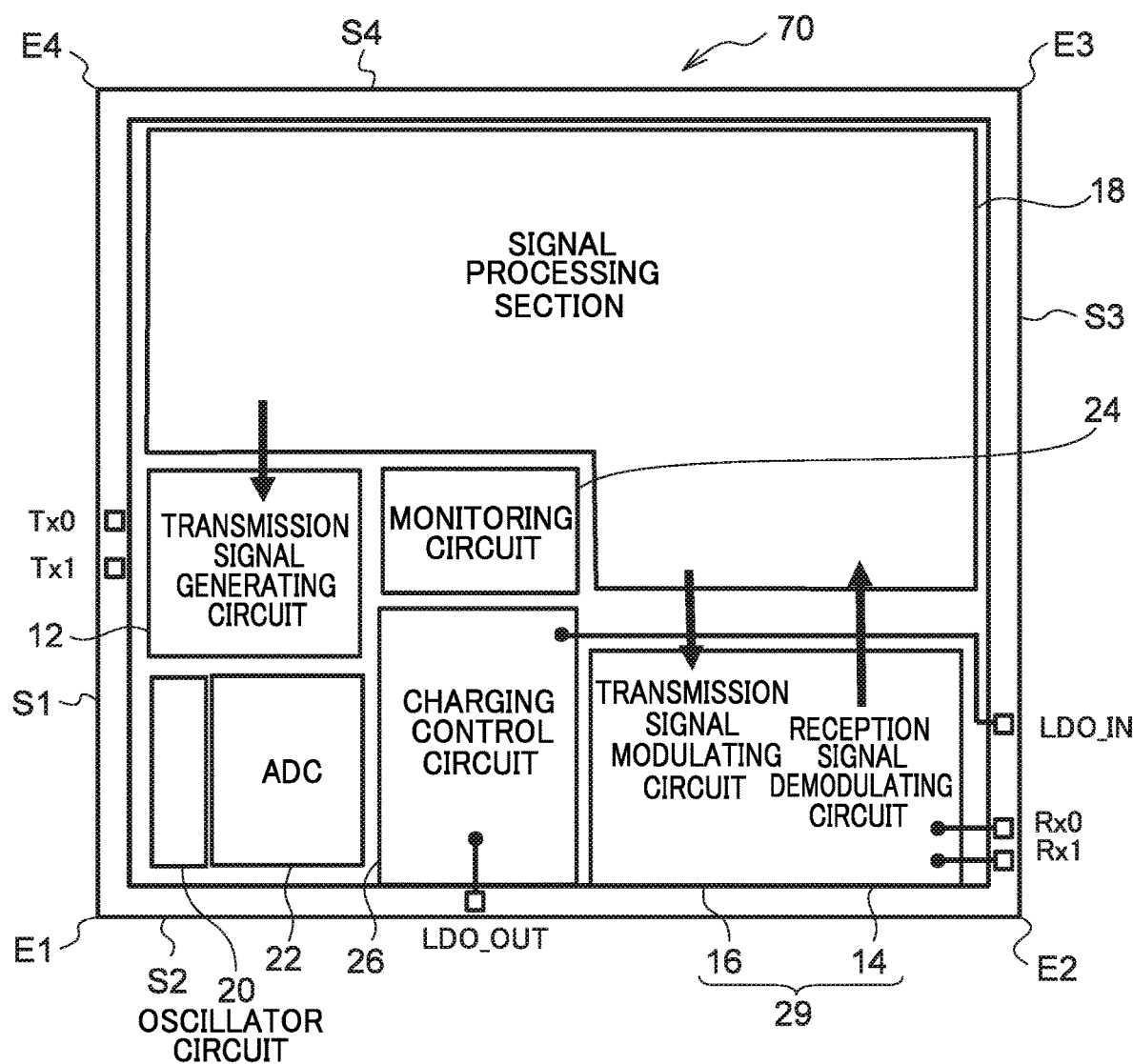
FIG. 6A is a plan diagram showing a circuit layout according to a first modified example of the second exemplary embodiment.

A circuit layout 70 according to the present exemplary embodiment is described with reference to FIG. 6A. In the circuit layout 70, a case in which the positions of the reception signal circuit 29, charging control circuit 26 and ADC 22 are altered from the circuit layout 50, is described. Therefore, the respective circuit blocks shown in FIG. 6A are similar to FIG. 3A and FIG. 3B. Accordingly, the same circuit blocks are assigned the same reference symbols and are not described in detail.

In the circuit layout 70, as shown in FIG. 6A, the charging control circuit 26 is arranged such that one edge thereof lies along the edge S2, disposed between the corner portion E1 and the corner portion E2, and the reception signal circuit 29 is arranged such that one edge thereof lies along the edge S2 with the position of one corner portion thereof corresponding with the corner portion E2. The monitoring circuit 24 and the ADC 22 are disposed so as to divide (separate) the transmission signal generating circuit 12, that is the interfering circuit block, from the reception signal circuit 29, that is the interfered circuit block. In the circuit layout 70, the terminals RX0 and RX1 are disposed along the edge S3 and are disposed close to the terminal LDO_IN, which is also disposed along the edge S3. This is in consideration of the fact that, outputs from the rectifying circuit 28 that is connected to the terminals RX0 and RX1 are inputted into the terminal LDO_IN.

Namely, in the circuit layout 70, the monitoring circuit 24 and the ADC 22 are disposed in the middle, and the position of the reception signal circuit 29 is more distant from the transmission signal generating circuit 12 than in the circuit layout 50. Thus, in the present exemplary embodiment, respective positions of the interfering circuit block and the interfered circuit block are disposed along edges of the integrated circuit of the semiconductor device 10 that intersect with one another, the positions along the edges may be freely modified, with consideration of levels of electromagnetic interference and thermal interference.

Second Modified Example of the Second Exemplary Embodiment

Figure 6B:
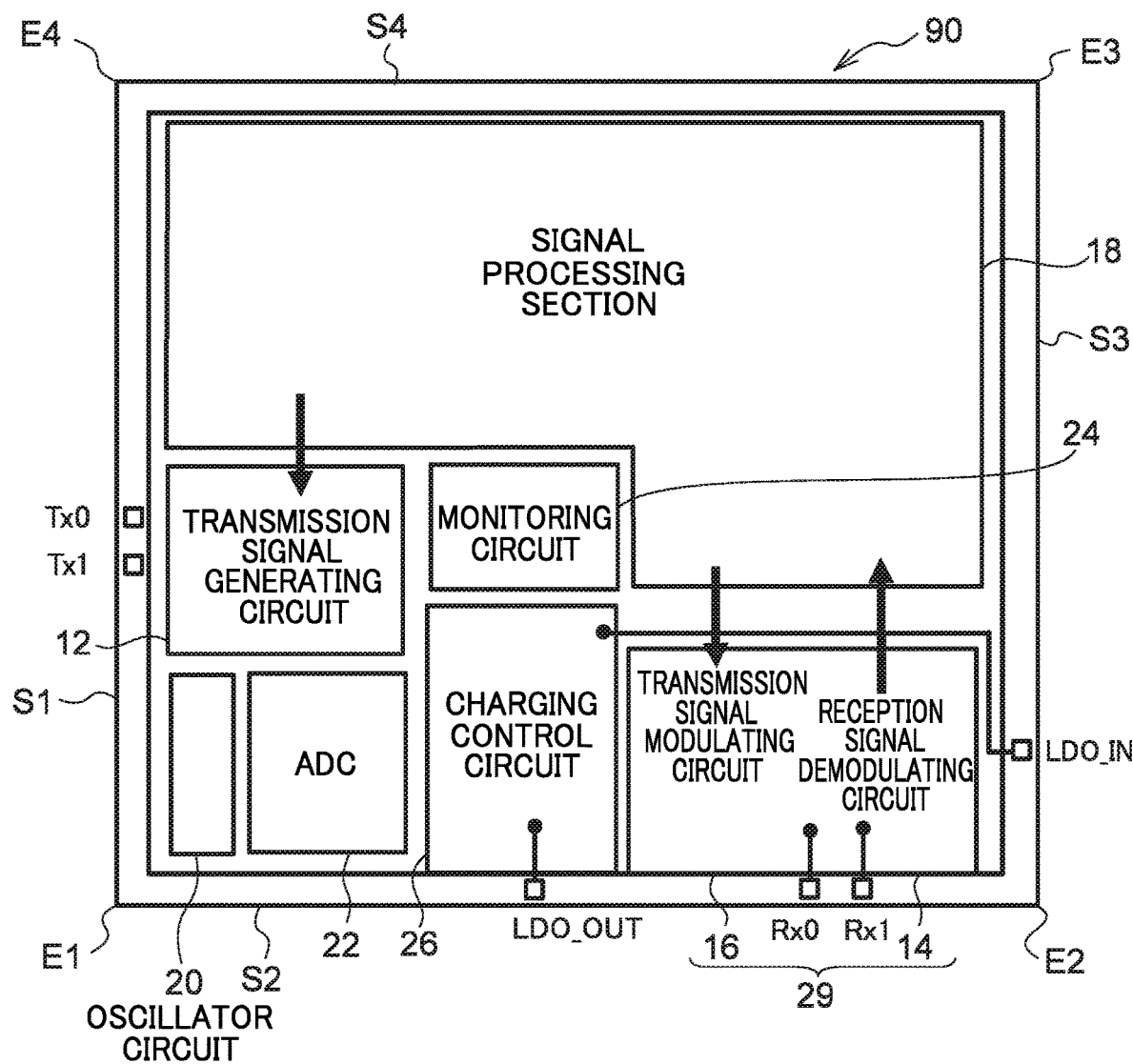
FIG. 6B is a plan diagram showing a circuit layout according to a second modified example of the second exemplary embodiment.

A circuit layout 90 according to the present exemplary embodiment is described with reference to FIG. 6B. In the circuit layout 90, a case in which, as shown in FIG. 6B, the positions of the terminals RX0 and RX1 are modified from positions along the edge S3 to positions along the edge S2, is described. Therefore, the respective circuit blocks shown in FIG. 6B are similar to FIG. 3A and FIG. 3B. Accordingly, the same circuit blocks are assigned the same reference symbols and are not described in detail.

In the circuit layout 90 according to the present exemplary embodiment, the terminal LDO_IN and the terminals RX0 and RX1 are divided between different edges of the semiconductor integrated circuit of the semiconductor device 10, which edges intersect at the corner portion E2. Therefore, an external circuit (the rectifying circuit 28 or the like) may be arranged efficiently even if, for example, the circuit size of the external circuit is relatively large.

More specifically, the circuit layout 90 is a layout that is useful in a case in which constructing, for example, a semiconductor module of the present exemplary embodiment. As described above, a semiconductor module according to one case includes the semiconductor device 10B disposed inside a package, and the external antenna ATB resonance circuit 27B and rectifying circuit 28 connected to the terminals RX0 and RX1 of the semiconductor device 10B. As shown in FIG. 2, one terminal of the rectifying circuit 28 is connected to the terminal LDO_IN. In this case, the antenna ATB, the resonance circuit 27B and the rectifying circuit 28 are arranged in, for example, this order from the terminals TX0 and TX1 disposed along the edge S1, past the terminals RX0 and RX1 disposed along the edge S2, to the terminal LDO_IN disposed along the edge S3. These terminals and terminals of the circuits are connected together via, for example, wire bonds. Thus, according to the circuit layout 90, the antenna ATB, resonance circuit 27B and rectifying circuit 28 with certain sizes may be efficiently disposed along the edges S1, S2 and S3, and thus may be put into a natural arrangement following the flow of signals.

What is claimed is:

1. A semiconductor device comprising:
a single semiconductor integrated circuit of a rectangular shape and having a first edge that connects a first corner portion and a fourth corner portion, a second edge that connects the first corner portion and a second corner portion, a third edge that opposes the first edge and that connects the second corner portion and a third corner portion, and a fourth edge that opposes the second edge and that connects the third corner portion and the fourth corner portion;
a transmission signal circuit block on the single semiconductor integrated circuit and that transmits first data signals, or the first data signals and first power signals, to another semiconductor device;
a reception signal circuit block on the single semiconductor integrated circuit and that receives second data signals, or the second data signals and second power signals, transmitted from the another semiconductor device;
a signal processing circuit block; and
at least one of a charging control circuit block or a monitoring circuit block,
wherein the transmission signal circuit block is disposed along the first edge and close to the fourth corner portion,
wherein the reception signal circuit block is disposed along the second edge and close to the second corner portion, and
wherein the signal processing circuit block, and at least one of the charging control circuit block or the monitoring circuit block, are disposed between the transmission signal circuit block and the reception signal circuit block.

2. The semiconductor device according to claim 1, wherein the charging control circuit block is disposed along the second edge.

3. The semiconductor device according to claim 1, wherein an input terminal of the charging control circuit block is disposed along the third edge of the single semiconductor integrated circuit, and
an input terminal of the reception signal circuit block is disposed along the second edge.

4. The semiconductor device according to claim 1, wherein an input terminal of the charging control circuit block and an input terminal of the reception signal circuit block are disposed along the third edge of the single semiconductor integrated circuit.

5. The semiconductor device according to claim 1, wherein the signal processing circuit block processes the first data signals before being transmitted from the transmission signal circuit block, or the second data signals received by the reception signal circuit block.

6. The semiconductor device according to claim 1, wherein the charging control circuit block uses the second power signals received by the reception signal circuit block to generate a pre-specified voltage.

7. The semiconductor device according to claim 1, wherein the monitoring circuit block monitors a condition inside the semiconductor device.

8. The semiconductor device according to claim 1, further comprising an antenna and a resonance circuit that are connected to an output terminal of the transmission signal circuit block.

9. The semiconductor device according to claim 1, further comprising an antenna, a resonance circuit and a rectifying circuit that are connected to an input terminal of the reception signal circuit block.

10. A semiconductor module comprising:
the semiconductor device according to claim 1; and
an antenna and a resonance circuit that are connected to an output terminal of the transmission signal circuit block.

11. A semiconductor module comprising:
the semiconductor device according to claim 1; and
an antenna, a resonance circuit and a rectifying circuit that are connected to an input terminal of the reception signal circuit block.

* * * * *